United States Patent

Sleeckx

[11] Patent Number: 6,166,116
[45] Date of Patent: Dec. 26, 2000

[54] CARBONATE POLYMER COMPOSITIONS STABILIZED AGAINST DISCOLORATION AND PHYSICAL PROPERTY DETERIORATION DURING STERILIZATION BY IONIZING RADIATION

[75] Inventor: Jozef J. Sleeckx, Sint-Martens-Latem, Belgium

[73] Assignee: The Dow Chemical Company, Midland, Mich.

[21] Appl. No.: 09/325,249

[22] Filed: Jun. 3, 1999

[51] Int. Cl.[7] ............................................. C08K 5/43
[52] U.S. Cl. ............................................. 524/168; 524/169
[58] Field of Search ............................................. 524/168

[56] References Cited

U.S. PATENT DOCUMENTS

| | | |
|---|---|---|
| 3,028,365 | 4/1962 | Schnell et al. . |
| 3,169,121 | 2/1965 | Goldberg . |
| 3,370,056 | 2/1968 | Yotsuzuka et al. . |
| 4,156,069 | 5/1979 | Prevorsek et al. . |
| 4,260,731 | 4/1981 | Mori et al. . |
| 4,529,791 | 7/1985 | Glass . |
| 4,677,162 | 6/1987 | Grigo et al. . |
| 4,804,692 | 2/1989 | Lundy et al. . |
| 4,873,271 | 10/1989 | Lundy et al. . |
| 4,874,802 | 10/1989 | Lundy et al. . |
| 4,880,855 | 11/1989 | Nelson et al. . |
| 4,880,856 | 11/1989 | Avakian . |
| 4,904,710 | 2/1990 | Nace . |
| 4,939,185 | 7/1990 | Nelson et al. . |

FOREIGN PATENT DOCUMENTS

| | | |
|---|---|---|
| 439763 | 8/1991 | European Pat. Off. . |
| 296473 | 10/1992 | European Pat. Off. . |
| 572889 A1 | 12/1993 | European Pat. Off. . |
| 359366 | 3/1994 | European Pat. Off. . |
| 611797 A1 | 8/1994 | European Pat. Off. . |
| 338319 | 6/1995 | European Pat. Off. . |
| 535464 A2 | 7/1995 | European Pat. Off. . |
| 732365 A1 | 9/1996 | European Pat. Off. . |
| 742260 A1 | 11/1996 | European Pat. Off. . |
| 794218 A2 | 9/1997 | European Pat. Off. . |
| 08311322 A2 | 11/1996 | Japan . |
| 08311323 A2 | 11/1996 | Japan . |
| 08311324 A2 | 11/1996 | Japan . |
| 09003314 A2 | 1/1997 | Japan . |
| 09031315 A2 | 2/1997 | Japan . |
| 09124918 A2 | 5/1997 | Japan . |
| 09176479 A2 | 7/1997 | Japan . |
| 09310010 A2 | 12/1997 | Japan . |

*Primary Examiner*—Paul R. Michl

[57] ABSTRACT

Disclosed are carbonate polymer compositions comprising a poly(oxyalkylene) derivative, a free di-sulfonimide, and optionally a salt and methods of preparation for said compositions. Such carbonate polymer compositions exhibit good color stability and physical property retention when irradiated with ionizing radiation for sterilization.

24 Claims, No Drawings

CARBONATE POLYMER COMPOSITIONS STABILIZED AGAINST DISCOLORATION AND PHYSICAL PROPERTY DETERIORATION DURING STERILIZATION BY IONIZING RADIATION

FIELD OF THE INVENTION

This invention relates to a carbonate polymer composition which exhibits good color stability and physical property retention when irradiated with ionizing radiation for sterilization wherein the carbonate polymer is stabilized by the incorporation of a poly(oxyalkylene) derivative, a free di-sulfonimide represented by the formula:

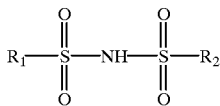
(1)

and optionally a salt and methods of preparation of such compositions.

BACKGROUND OF THE INVENTION

There is a distinct need for carbonate polymer moldings that are resistant to ionizing radiation so that they can be sterilized without substantial loss of clarity and physical characteristics.

Stabilization of polycarbonate resins to ionizing radiation for sterilization by the addition of poly(oxyalkylene) derivatives is known. See for example U.S. Pat. No. 4,904,710, EP-A-296473, EP-A-338319, U.S. Pat. No. 4,874,802, EP-A-359366, U.S. Pat. No. 4,804,692, U.S. Pat. No. 4,873,271, and EP-A-439763. However, these carbonate polymers are not sufficiently stabilized against yellowing, especially when irradiation occurs in the absence of oxygen.

Stabilization of carbonate polymer compositions to ionizing radiation for sterilization by incorporating certain specific types of sulfur containing compounds is known. For example, incorporating a disulfide is disclosed in U.S. Pat. No. 4,939,185, incorporating a sulfoxide is disclosed in JP 08311322 A2, incorporating a sulfone is disclosed in U.S. Pat. No. 4,880,855, JP 09124918 A2 and JP 08311323 A2, incorporating a sulfonate is disclosed in JP 08311324 A2, JP 09031315 A2, JP 09310010 A2 and JP 09003314 A2, and incorporating a thiadiazole and a thiazole is disclosed in U.S. Pat. No. 4,880,856.

Further, stabilization of carbonate polymer compositions to ionization radiation for sterilization by incorporating poly(oxyalkylene) derivatives and sulfur containing compounds is known. For example, incorporation of a poly(oxyalkylene) derivative and a disulfide is disclosed in EP 572889 A1, EP 732365 A1 and EP 611797 A1, incorporation of a poly(oxyalkylene) derivative and a sulfoxide or sulfone is disclosed in JP 09176479 A2 and EP 794218 A2, incorporation of a poly(oxyalkylene) derivative and sulfonates is disclosed in EP 535464 A2, and incorporation of a poly(oxyalkylene) derivative and a sulfamide is disclosed in EP 664321 A1 and EP 742260 A1.

However, the carbonate polymer compositions thus obtained by utilizing any of such methods have drawbacks. These carbonate polymer compositions are not sufficiently stabilized against yellowing. Further, compositions containing these sulfur containing compounds show undesirable molecular weight degradation which can adversely affect the physical properties, for example, the strength of the carbonate polymer. The present invention addresses these problems.

SUMMARY OF THE INVENTION

Accordingly, the present invention is directed to carbonate polymer compositions comprising (a) a carbonate polymer, (b) a poly(oxyalkylene) derivative, (c) a free di-sulfonimide represented by the formula:

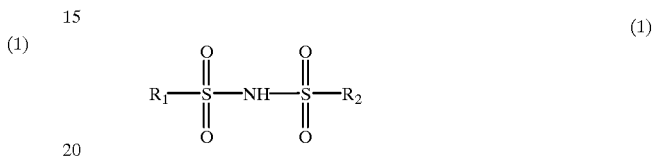
(1)

wherein $R_1$ and $R_2$ are independently an optionally substituted alkyl, aryl, alkylaryl, or arylalkyl group, and (d) optionally a salt capable of providing buffering character to the carbonate polymer composition containing the free di-sulfonimide.

In a further embodiment, the invention also involves a method of preparing the forgoing carbonate polymer composition comprising combining (a) a carbonate polymer, (b) a poly(oxyalkylene) derivative, (c) a free di-sulfonimide represented by the formula set forth above, and (d) optionally a salt.

In yet a further embodiment, the invention involves a method of molding or extruding a carbonate polymer composition whereby (a) a carbonate polymer which has been admixed with at least (b) a poly(oxyalkylene) derivative, (c) a free di-sulfonimide represented by the formula set forth above, and (d) optionally a salt is molded or extruded into an article.

In yet a further embodiment, the invention involves molded or extruded articles of a carbonate polymer composition comprising (a) a carbonate polymer which has been admixed with at least (b) a poly(oxyalkylene) derivative, (c) a free di-sulfonimide represented by the formula set forth above, and (d) optionally a salt.

In yet a further embodiment, the invention involves a method of sterilizing with ionizing irradiation a molded or extruded article of a carbonate polymer composition comprising (a) a carbonate polymer which has been admixed with at least (b) a poly(oxyalkylene) derivative, (c) a free di-sulfonimide represented by the formula set forth above, and (d) optionally a salt.

In yet a further embodiment, the invention involves molded or extruded articles of a carbonate polymer composition comprising (a) a carbonate polymer which has been admixed with at least (b) a poly(oxyalkylene) derivative, (c) a free di-sulfonimide represented by the formula set forth above, and (d) optionally a salt, wherein said articles have been irradiated with ionizing radiation for sterilization.

DETAILED DESCRIPTION OF THE EMBODIMENTS

Suitable carbonate polymers employed in the present invention as component (a) are well known in the literature and can be prepared by known techniques, for example several suitable methods are disclosed in U.S. Pat. Nos. 3,028,365, 4,529,791, and 4,677,162, which are hereby incorporated by reference in their entirety. In general, carbonate polymers can be prepared from one or more multihydric compounds by reacting the multihydric compounds, preferably an aromatic dihydroxy compound such as a diphenol, with a carbonate precursor such as phosgene, a haloformate or a carbonate ester such as diphenyl or dimethyl carbonate. Preferred diphenols are 2,2-bis(4-hydroxyphenyl)-propane, 1,1-bis(4-hydroxyphenyl)-1-phenylethane, 3,3-bis(para-hydroxyphenyl)phthalide and bishydroxyphenylfluorene. The carbonate polymers can be prepared from these raw materials by any of several known processes such as the known interfacial, solution or melt processes. As is well known, suitable chain terminators and/or branching agents can be employed to obtain the desired molecular weights and branching degrees.

It is understood, of course, that the carbonate polymer may be derived from (1) two or more different dihydric phenols or (2) a dihydric phenol and a glycol or a hydroxy- or acid-terminated polyester or a dibasic acid in the event a carbonate copolymer or heteropolymer rather than a homopolymer is desired. Thus, included in the term "carbonate polymer" are the poly(ester-carbonates) of the type described in U.S. Pat. Nos. 3,169,121, 4,156,069, and 4,260,731, which are hereby incorporated by reference in their entirety. Also suitable for the practice of this invention are blends of two or more of the above carbonate polymers. Of the aforementioned carbonate polymers, the polycarbonates of bisphenol-A are preferred.

Polymeric derivatives of alkylene oxides useful as component (b) of the present invention are poly(oxyalkylene) derivatives, sometimes referred to as polyethers or polyols, and their monoalkyl or dialkyl ethers. The poly(oxyalkylene) derivatives used in this invention are well known from U.S. Pat. No. 3,370,056 which is incorporated by reference herein.

Preferably, the poly(oxyalkylene) derivatives are prepared by reacting one or more alkylene oxides such as ethylene oxide, propylene oxide, or butylene oxide with one or more initiator(s) having at least one reactive hydrogen, such as, alcohols, amines, amides, or acids. Preferable initiators are alcohols such as methanol, ethanol, fatty alcohols, glycol, or alcohols containing an unsaturated carbon—carbon bond, preferably allyl alcohol. The addition polymers can be in the form of random, block, or homopolymer form. The method of preparation of these random or block copolymers is well known in the art.

Poly(oxyalkylene)diols are obtained when the reaction with one or more alkylene oxides is initiated by a base or with a diol, preferably glycol. Branched poly(oxyalkylene) polyols are obtained when multifunctional alcohols are used as initiator, such as triols, tetrols, pentols, sugars and sugar alcohols.

The monoalkyl poly(oxyalkylene) alcohols are obtained when mono-functional alkyl alcohols are used as the initiator for the alkylene oxides. Preferred alcohols are methanol, ethanol, fatty alcohols, or alcohols containing an unsaturated carbon—carbon double bond, preferably allyl alcohol.

The dialkyl ethers are made by capping the foregoing monoalkyl poly(oxyalkylene) alcohols with an alkyl group using an appropriate alkyl halide to terminate the polymerization reaction.

Examples of the poly(oxyalkylene) derivatives in the present invention are compounds represented by the general formulas (2) to (4) mentioned hereinbelow. One or more compound may be used. Among such compounds, compounds represented by formulas (2) and (3) are preferred, and polypropylene glycol and polyethylene glycol monoalkyl ether are particularly preferred.

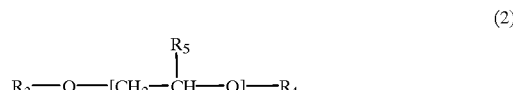

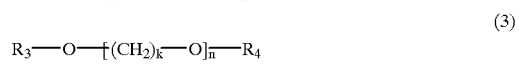

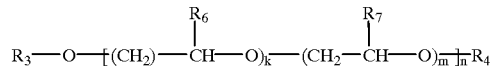

In the general formulas (2) to (4), $R_5$, $R_6$, and $R_7$ are each independently a hydrogen atom, a halogen atom, an optionally substituted alkyl group of 1 to 10 carbon atoms, an optionally substituted alkyl group of 1 to 10 carbon atoms with one or more carbon—carbon unsaturated double bond(s), an optionally substituted aryl group of 6 to 10 carbon atoms, an optionally substituted alkylaryl group of 6 to 18 carbon atoms, an optionally substituted arylalkyl group of 6 to 18 carbon atoms, or an optionally substituted cycloalkyl group of 1 to 10 carbon atoms, n is an integer of at least 1, preferably 1 to 1,000, k is an integer of at least 1, preferably 1 to 1,000, m is an integer of at least 1, preferably 1 to 1,000, and $R_3$ and $R_4$ are each independently a hydrogen atom, an optionally substituted alkyl group of 1 to 10 carbon atoms, an optionally substituted alkyl group of 1 to 10 carbon atoms with one or more carbon—carbon unsaturated double bond(s), an optionally substituted aryl group of 6 to 10 carbon atoms, an optionally substituted alkylaryl group of 6 to 18 carbon atoms, an optionally substituted arylalkyl group of 6 to 18 carbon atoms, an optionally substituted cycloalkyl group of 1 to 10 carbon atoms or $R_8$—CO— (wherein $R_8$ is an optionally substituted alkyl group of 1 to 20 carbon atoms, an optionally substituted aryl group of 6 to 10 carbons atoms, an optionally substituted alkylaryl group of 6 to 18 carbon atoms, an optionally substituted arylalkyl group of 6 to 18 carbon atoms, or an optionally substituted cycloalkyl group of 1 to 10 carbon atoms).

The poly(oxyalkylene) derivative is employed in the carbonate polymer compositions of the present invention in amounts sufficient to provide the desired color stability to the carbonate polymer composition. In general, the poly(oxyalkylene) derivative is employed in amounts sufficient to achieve color stabilization, typically amounts of at least about 50 parts per million (ppm) based on the weight of the carbonate polymer, preferably at least about 100 ppm, more preferably at least about 500 ppm, even more preferably at least about 1,000 ppm, even more preferably at least about 3,000 ppm, and most preferably at least about 5,000 ppm based on the weight of the carbonate polymer. In general, to avoid adversely effecting the good physical properties inherent in carbonate polymers the poly(oxyalkylene) derivative is used in amounts less than or equal to about 50,000 ppm, preferably less than or equal to about 40,000 ppm, more preferably less than or equal to about 30,000 ppm, even more preferably less than or equal to about 20,000 ppm, even more preferably less than or equal to about 15,000 ppm, and most preferably less than or equal to about 10,000 ppm based on the weight of the carbonate polymer.

The carbonate polymer compositions of this invention have dispersed therein (c) a free di-sulfonimide represented by the formula:

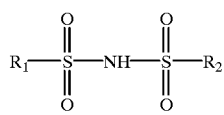

(5)

wherein $R_1$ and $R_2$ are independently an optionally substituted alkyl, aryl, arylalkyl or alkylaryl group. Preferably, the alkyl group comprises 1 to 10 carbon atoms, the aryl group comprises 6 to 12 carbon atoms, the arylalkyl or alkylaryl group comprises 6 to 18 carbon atoms. Exemplary of such compounds are N-(methylsulfonyl)-methanesulfonimide and optionally aromatically substituted phenyl, benzyl, and tolyl groups wherein the substituent(s) are alkyl, aryl, halo, amino, including N-alkylamino and N-N-dialkyl amino, alkyl carbonyl, alkylaryl, arylalkyl, and the like. Preferably the free di-sulfonimide is chosen from the group consisting of N-(phenylsulfonyl)-benzenesulfonimide and N-(benzylsulfonyl)-phenylmethanesulfonimide and most preferably N-(p-tolylsulfonyl)-p-toluenesulfonimide (CAS No. 3695-00-9).

One or more free di-sulfonimides described above are present in an amount sufficient to provide a desirable degree of color stability to the carbonate polymer when the carbonate polymer composition is irradiated with ionizing radiation in the presence and/or absence of oxygen. In general, the free di-sulfonimide is employed in amounts of at least about 20 ppm based on the weight of the carbonate polymer, preferably at least about 100 ppm, more preferably at least about 500 ppm, even more preferably at least about 750 ppm, and most preferably at least about 1,000 ppm based on the weight of the carbonate polymer. In general, the free di-sulfonimide(s) are used in amounts less than or equal to about 5,000 ppm based on the weight of the carbonate polymer, preferably less than or equal to about 4,000 ppm, more preferably less than or equal to about 3,000 ppm, even more preferably less than or equal to about 2,000 ppm, and most preferably less than or equal to about 1,500 ppm based on the weight of carbonate polymer.

The salt used as component (d) of this invention is suitably a salt of an organic or inorganic acid, preferably an alkaline metal salt of an organic or inorganic acid. Desirably, such a compound is one that is capable of providing buffering character to the carbonate polymer composition containing an amount of the aforementioned free di-sulfonimide. The $pK_a$ value of the corresponding acid of the salt, is equal to or greater than about 2 and less than or equal to 14 as measured in aqueous solution. Preferably, the salt is an aromatic sulfonamide salt or sulfanilamide salt represented by the formula:

(6)

wherein Ar is phenyl, aromatically substituted phenyl, phenylene, or aromatically substituted phenylene, wherein the substituent(s) are halo, alkyl, aryl, amino, including N-alkylamino and N-N-dialkylamino, alkyl carbonyl, alkylaryl, arylalkyl, and the like; R is carbonyl, arylcarbonyl (e.g., benzoyl), arylaminocarbonyl, arylalkylaminocarbonyl (e.g., benzylaminocarbonyl), arylsulfonyl (e.g., tolylsulfonyl), thiazolyl including alkylthiazolyl, pyrimidinyl, quinolinyl and pyrrolidinyl, thiadiazolyl including alkylthiadiazolyl, etc; M is an alkali metal cation and n is a number corresponding to the valence of M. Exemplary of such aromatic sulfonamide or sulfanilamide salts are the alkali metal salts of saccharin, N-(N'-benzylaminocarbonyl)-sulfanilamide, N-(phenylcarboxyl)-sulfanilamide, N-(2-pyrimidinyl)-sulfanilamide, N-(2-thiazolyl)-sulfanilamide, and other salts disclosed in U.S. Pat. No. 4,254,015, which is hereby incorporated by reference.

More preferably, the salt is the alkali metal salt of (c) the free di-sulfonimide employed in the carbonate polymer composition represented by the formula:

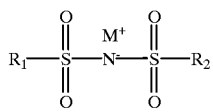

(7)

wherein $R_1$ and $R_2$ are independently an optionally substituted alkyl, aryl, alkylaryl or arylalkyl group, and M is an alkali metal cation, preferably sodium or potassium. Exemplary of such aromatic di-sulfonimide salts are the sodium and potassium salts of N-(methylsulfonyl)-methanesulfonimide, N-(phenylsulfonyl)-benzenesulfonimide, and N-(benzylsulfonyl)-phenylmethanesulfonimide and most preferably N-(p-tolylsulfonyl)-p-toluenesulfonimide. Combinations of the disclosed salts can also be employed.

The above mentioned preferred salts can also be formed in-situ. Therefore, to the forgoing free di-sulfonimide (1), a component is added with basic properties. This base should be strong enough to subtract the acidic hydrogen from the free di-sulfonimide, and convert the free di-sulfonimide partly or completely to the salt as described in formula (7). This base is strong enough when the $pK_a$ of the corresponding acid (derived from this particular base), in aqueous solution is equal to or greater than about 2 and less than or equal to 14.

If used, the salts described hereinabove are present in an amount sufficient to provide a desirable degree of molecular weight stability, sometimes referred to as buffering character, to the carbonate polymer when the carbonate polymer composition of the present invention is exposed to heat, for example during extrusion and/or injection molding processes. If present, the salt is employed in amounts of at least about 2 ppm based on the weight of the carbonate polymer, preferably at least about 20 ppm, more preferably at least about 100 ppm, more preferably at least about 500 ppm, even more preferably at least about 750 ppm, and most preferably at least about 1,000 ppm based on the weight of the carbonate polymer. If present, the salt is used in amounts less than or equal to about 5,000 ppm based on the weight of the carbonate polymer, preferably less than or equal to about 4,000 ppm, more preferably less than or equal to about 3,000 ppp, even more preferably less than or equal to about 2,000 ppm, and most preferably less than or equal to about 1,500 ppm based on the weight of carbonate polymer.

Other resins may be added to the carbonate polymer compositions of the present invention so long as the effects of the present invention are not impaired. For example polyethylene terephthalate, polybutylene terephthalate, polyester polycarbonate, or the like can be added. If present, other resin(s) are used in amounts of at least about 1 weight percent based on the weight of the carbonate polymer composition, preferably at least about 3 weight percent, more preferably at least about 5 weight percent, even more preferably at least about 7 weight percent, and most preferably at least about 10 weight percent based on the weight of the carbonate polymer composition. In general, if used other resin(s) are present in amounts less than or equal to about 50 weight percent based on the weight of the carbonate polymer composition, preferably less than or equal to about 40 weight percent, more preferably less than or equal to about 30 weight percent, even more preferably less than or equal to about 20 weight percent, and most preferably less than or equal to about 15 weight percent based on the weight of carbonate polymer composition.

Furthermore, any known additives that are commonly used in carbonate polymer compositions of this type may be added. Preferred additives of this type are fillers, reinforcements, stabilizers, colorants, antioxidants, antistatics, flow enhancers, mold releases, nucleating agents, etc. If present, the additive(s) are used in amounts of at least about 20 ppm based on the weight of the carbonate polymer composition, preferably at least about 100 ppm, more preferably at least about 500 ppm, even more preferably at least about 1,000 ppm, and most preferably at least about 10,000 ppm based on the weight of the carbonate polymer composition. In general, if used the additive(s) are present in amounts less than or equal to about 25 weight percent based on the weight of the carbonate polymer composition, preferably less than or equal to about 15 weight percent, more preferably less than or equal to about 10 weight percent, even more preferably less than or equal to about 5 weight percent, and most preferably less than or equal to about 1 weight percent based on the weight of carbonate polymer composition.

As a manner for incorporating, into the carbonate polymer, the poly(oxyalkylene) derivative, free di-sulfonimide, optional salt, and any other additives, any of methods known to those skilled in the art may be employed at any step until just before molding to obtain the final molded article. For example, the poly(oxyalkylene) derivative, free di-sulfonimide, optional salt, and other additives may be compounded into the resin prior to, during or after polymerization of the carbonate polymer or the carbonate polymer obtained by polymerization may be mixed with the poly(oxyalkylene) derivative, free di-sulfonimide, optional salt, and other additives with a tumble mixer, a ribbon blender, a high speed mixer and the like. The resulting mixture is then melt blended by a Banbury mixer, a single or twin screw extruder. There is no limitation to the order of compounding the above-mentioned compounds (the poly(oxyalkylene) derivative, the free di-sulfonimide, optional salt, or other additives) into the carbonate polymer. These compounds may be compounded simultaneously into the carbonate polymer or they may be incorporated in an arbitrary order.

The ionizing radiation-resistant carbonate polymer composition of the present invention is processed to give a medical part by a method known to those skilled in the art. Examples of medical parts are packing parts having a container form for accommodating or packaging injectors, surgical tools, intravenous injectors, operation instruments, and the like, for parts of medical apparatuses such as artificial lungs, artificial kidneys, anesthetic inhalators, vein connectors, hemodialyzers, blood filters, safety syringes and their accessories and for parts of centrifugal separators for blood, surgical tools, operation tools, intravenous injectors and the like. There is no specific limitation on the processing method. For example, any of the known molding methods such as injection molding, extrusion molding, blow molding, and press molding may be applied and the carbonate polymer composition may be molded under conditions similar to those for molding a known carbonate polymer.

When subjected to heat, for example under the conditions of melt blending the carbonate polymer components or processing the carbonate polymer composition into a molded or extruded article, carbonate polymer compositions containing acids, such as free di-sulfonimides, may demonstrate hydrolytic instability and the carbonate polymer may suffer from molecular weight degradation. Molecular weight degradation typically results in a lower average molecular weight for the carbonate polymer. Mechanical properties, especially strength, suffer when there is a decrease in average molecular weight of the carbonate polymer.

The molecular weight of the carbonate polymer is inversely proportional to its melt flow rate (MFR). MFR is typically measured by ASTM Designation D 1238-89, Condition O 300° C./1.2 kilograms (kg). As is known, the melt flow rate gives the amount of polymer in grams that flows through the apparatus in ten minutes (g/10 min) under the specified condition, lower molecular weight polymers having lower melt viscosities corresponding to higher melt flow rates.

Heat induced molecular weight instability for a carbonate polymer can be determined by comparing MFR values determined under identical temperature and pressure conditions but varying the conditioning time of the polymer in the MFR apparatus, i.e., exposing the carbonate polymer to a longer residence time or heat history. For example, the difference between MFRs (ΔMFR) e.g., at 300° C./1.2 kg, for a radiation-resistant carbonate polymer composition as a function of conditioning time in the MFR apparatus (e.g., at 480 and 960 seconds) is expressed as a percent increase (+) or decrease (−) relative to the MFR for the shorter conditioning time:

$$\Delta MFR = [(MFR_{960} - MFR_{480})/MFR_{480}] \times 100$$

A difference equal to or less than about±25 percent, preferably equal to or less than about±22 percent, more preferably equal to or less than about±18 percent, even more preferably equal to or less than about±17 percent, even more preferably equal to or less than about±15 percent, and most preferably equal to or less than about±13 percent represent a desirable degree of molecular weight stability.

Examples of the ionizing radiation are alpha-rays, a heavy electron beam, a proton beam, beta-rays, a neutron beam, gamma-rays, and X-rays. However, gamma-rays are preferred. Although there is no specific limitation on the amount of ionizing radiation to be irradiated, the amount is usually from about 20 to 50 kilogray (kGy).

In some cases oxygen must be excluded during the irradiation process. When subjected to ionizing radiation, especially in the absence of oxygen, carbonate polymer compositions containing only poly(oxyalkylene) derivatives can demonstrate color instability, i.e., carbonate polymer which is inherently optically transparent turns yellow. Yellowness Index (YI) is a quantitative determination of the color of the carbonate polymer composition. The difference in YI between the irradiated sample and the same sample before irradiation is called ΔYI. Preferably, the difference in ΔYI (DYI) determined on a carbonate polymer composition in the presence of oxygen ($\Delta YI_{+O2}$) and absence of oxygen ($\Delta YI_{-O2}$) is equal to or less than±45 percent, more preferably equal to or less than±35 percent, more preferably equal to or less than±25 percent, even more preferably equal to or less than±20 percent, and most preferably equal to or less than±15 percent based on the following equation:

$$DYI=(\Delta YI_{+O2}-\Delta YI_{-O2}/\Delta YI_{+O2})\times 100$$

To illustrate the practice of this invention, examples of preferred embodiments are set forth below. However, these examples do not in any manner restrict the scope of this invention.

EXAMPLES

Three Samples were prepared by mixing the dry components in a tumble mixer for 20 minutes, and then feeding the dry-blended formulation to a screw size/model (i.e., 25 mm Werner and Pfleider) twin screw extruder. The following were the compounding conditions on the Werner and Pfleider extruder: Barrel temperature profile: 240, 250, 260, 270, 280, 290, 300° C.; RPM: 250; Torque: 60 percent. The extrudate is cooled in the form of strands and comminuted as pellets. The pellets are dried in an air draft oven for at least 2 hours at 120° C., and then are used to prepare 50 mm×75 mm×3 mm thick test specimens on a 90 Ton Arburg injection molding machine, having the following molding conditions: Barrel temperatures of 260, 270, 280, 290, 300° C.; Mold temperature: 80° C.; Holding pressure: 700 bar; Injection speed: 50 cm/s Cycle time: 40 seconds.

The formulation content and properties of Examples 1 and 2 and Comparative Examples A to D are given in Table 1 below in percent by weight of the carbonate polymer. In Table 1:

Polycarbonate is a bisphenol-A polycarbonate homopolymer commercially available as CALIBRE™ 300 from Dow Chemical having a MFR, as determined by ASTM D 1238, at conditions of 300° C./1.2 kg, of 13 g/10 min.;

Polypropylene glycol is commercially available as polyglycol P2000 from Dow Chemical with an average molecular weight of 2,000 and a specific gravity of 1.002;

Polyoxyethylene monoallyl ether (A200R) has a specific gravity of 1.06 and a viscosity of about 10 centipoise (cp) available from Nippon Oil and Fat;

Saccharine is 2,3-dihydro-3-oxobenzisosulfonazole and is commercially available from Aldrich (catalog number 24,093-1);

Sodium saccharide is the sodium salt of saccharine and is commercially available from Aldrich (catalog number 24,431-7);

HPTSM is N-(p-tolylsulfonyl)-p-toluenesulfonimide commercially available from Acros Organics (catalog number 40921-0250); and KPTSM is the potassium salt of N-(p-tolylsulfonyl)-p-toluenesulfonimide commercially available from Acros Organics (catalog number 40920-0010).

The following tests were run on the samples and the results of these tests are shown in Table 1:

$YI_0$ was determined on molded, unirradiated test specimens and gamma irradiated test specimens in the presence ($YI_{+O2}$) and absence ($YI_{-O2}$) of oxygen. YI was determined on a Hunterlab ColorQuest instrument in the transmittance mode with an angle of 10° and a D65 light source. The color is expressed YI units. YI index values are reported as an average of 10 test specimens. Irradiated specimens were exposed to gamma radiation produced by a $Co^{60}$ source. The exposure time to the gamma-rays is recorded in hours and was adjusted to get an exposure level between 24 and 26 kGy. Prior to irradiation, 10 test specimens for each formulation were packed in a barrier bag and sealed. For the samples, which were irradiated under oxygen deficient conditions, an oxygen-absorbing tablet was inserted into the bag before sealing. For the samples exposed to oxygen, air was allowed in the bag prior to sealing and no oxygen absorbing tablet was added. The samples were sealed for at least four days prior to irradiation. After irradiation, samples were kept sealed and conditioned in the dark from 14 to 22 days after exposure and opened just prior to the color measurement. In Table 1 YI(days) data are mentioned. This value represents the measured YI value after allowing the plaques to condition in the dark for the number of days as specified between the parentheses.

MFR was measured on non-irradiated pellets for each formulation (i.e., after carbonate polymer compositions were compounded on the twin screw extruder and comminuted as pellets). MFR was determined according to ASTM D 1238 on a Zwick Melt flow rate apparatus, at conditions of 300° C. and an applied load of 1.2 kg. The pellets were dried for at least four hours at a temperature of 120° C. prior to the measurement. Pellets were inserted into the barrel of the instrument and allowed to condition for 480 seconds ($MFR_{480}$) or 960 seconds ($MFR_{960}$) prior to the measurement.

TABLE 1

| Comparative Sample | A | B | C | D | Example 1 | Example 2 |
|---|---|---|---|---|---|---|
| Component | | | | | | |
| Polycarbonate | balance | balance | balance | balance | balance | balance |
| P2000, ppm | 9000 | | 9000 | | 9000 | |
| A200R, ppm | | 5000 | | 5000 | | 5000 |
| sodium saccharide | | | | 240 | | |
| saccharine, ppm | | | 3000 | 200 | | |
| KPTSM, ppm | | | | | 1400 | 360 |
| HPTSM, ppm | | | | | 1250 | 300 |
| $YI_0$ | 2.3 | 1.54 | 3.1 | 28.04 | 2.4 | 2.55 |
| $YI_{+O2}$ (days) | 10.3 (22) | 7.5 (21) | 8.7 (14) | ND | 9.4 (22) | 8.85 (22) |
| $\Delta YI_{+O2}$ | 8.0 | 5.96 | 5.6 | ND | 7.0 | 6.30 |
| $YI_{-O2}$ (days) | 16.2 (22) | 5.23 (21) | 6.0 (14) | ND | 8.5 (22) | 8.26 (22) |
| $\Delta YI_{-O2}$ | 14.1 | 3.69 | 2.9 | ND | 6.1 | 5.71 |
| DYI, % | −76.3 | 38.1 | 48.2 | ND | 12.9 | 9.37 |
| $MFR_{480}$, g/10 min | 16.7 | 18.6 | 32.8 | ND | 17.0 | 15.2 |
| $MFR_{960}$, g/10 min | 18.0 | 22.0 | 40.3 | ND | 19.1 | 16.1 |
| $\Delta MFR_{480/960}$, % | 7.8 | 18.3 | 22.9 | ND | 12.4 | 5.9 |

ND = not determined

What is claimed is:

1. A carbonate polymer composition comprising:

(a) a carbonate polymer, (b) a poly(oxyalkylene) derivative, (c) a free di-sulfonimide represented by the formula:

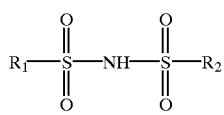

(1)

wherein $R_1$ and $R_2$ are independently an optionally substituted alkyl, aryl, arylalkyl or alkylaryl group, and (d) optionally a salt capable of providing buffering character to the carbonate polymer composition containing the free di-sulfonimide.

2. The carbonate polymer composition of claim 1 wherein the amount of the poly(oxyalkylene) derivative is in the range of about 50 to about 50,000 ppm based on the weight of the carbonate polymer.

3. The carbonate polymer composition of claim 1 wherein the poly(oxyalkylene) derivative is polypropylene glycol or polyethylene glycol monoallyl ether.

4. The carbonate polymer composition of claim 1 wherein the poly(oxyalkylene) derivative is polypropylene glycol.

5. The carbonate polymer composition of claim 1 wherein the amount of the free di-sulfonimide is in the range of about 20 ppm to about 5,000 ppm based on the weight of the carbonate polymer.

6. The carbonate polymer composition of claim 1 wherein the free di-sulfonimide is N-(p-tolylsulfonyl)-p-toluenesulfonimide.

7. The carbonate polymer composition of claim 1 wherein the amount of the salt is in the range of 0 ppm to about 5,000 ppm based on the weight of the carbonate polymer.

8. The carbonate polymer composition of claim 1 wherein the salt is an aromatic sulfonamide or sulfanilamide represented by the formula:

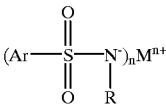

(6)

wherein Ar is phenyl, aromatically substituted phenyl, phenylene, or aromatically substituted phenylene, wherein the substituent(s) are halo, alkyl, aryl, amino, alkyl carbonyl, alkylaryl, or arylalkyl; R is carbonyl, arylcarbonayl, arylaminocarbonyl, araylalkylaminocarbonyl, arylsulfonyl, thiazolyl, or thiadiazolyl; M is an alkali metal cation and n is a number corresponding to the valence of M.

9. The carbonate polymer composition of claim 1 wherein the salt is represented by the formula:

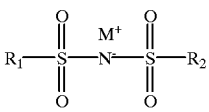

(7)

wherein $R_1$ and $R_2$ are independently an optionally substituted alkyl, aryl, alkylaryl or arylalkyl group, and M is an alkali metal cation.

10. The carbonate polymer composition of claim 1 wherein the salt is the sodium or potassium salt of N-(p-tolylsulfonyl)-p-toluenesulfonimide.

11. The carbonate polymer composition of claim 1 comprising:

(a) a carbonate polymer, (b) from about 50 ppm to about 50,000 ppm polypropylene glycol or polyethylene glycol monoallyl ether, (c) from about 20 ppm to about 5,000 ppm N-(p-tolylsulfonyl)-p-toluenesulfonimide, and (d) from 0 ppm to about 5,000 ppm of the sodium or potassium salt of N-(p-tolylsulfonyl)-p-toluenesulfonimide, wherein ppm are based on weight of the carbonate polymer.

12. The carbonate polymer composition of claim 1 comprising:
(a) a carbonate polymer,
(b) from about 5,000 ppm to about 15,000 ppm polypropylene glycol,
(c) from about 1,000 ppm to about 2,000 ppm N-(p-tolylsulfonyl)-p-toluenesulfonimide, and
(d) from 0 ppm to 2,000 ppm of the sodium or potassium salt of N-(p-tolylsulfonyl)-p-toluenesulfonimide,
wherein ppm are based on weight of the carbonate polymer.

13. The carbonate polymer composition of claim 1 comprising:
(a) a carbonate polymer,
(b) from about 3,000 ppm to about 10,000 ppm polyethylene glycol monoallyl ether,
(c) from about 100 ppm to about 500 ppm N-(p-tolylsulfonyl)-p-toluenesulfonimide, and
(d) from 0 ppm to 500 ppm of the sodium or potassium salt of N-(p-tolylsulfonyl)-p-toluenesulfonimide,
wherein ppm are based on weight of the carbonate polymer.

14. A method for preparing a carbonate polymer composition comprising the step of combining:
(a) a carbonate polymer,
(b) a poly(oxyalkylene) derivative,
(c) a free di-sulfonimide represented by the formula:

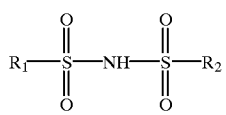

(1)

wherein $R_1$ and $R_2$ are independently an optionally substituted alkyl, aryl, arylalkyl or alkylaryl group, and
(d) optionally a salt capable of providing buffering character to the carbonate polymer composition containing the free di-sulfonimide.

15. The method according to claim 14 wherein the poly(oxyalkylene) derivative is polypropylene glycol or polyethylene glycol monoallyl ether, the free di-sulfonimide is N-(p-tolylsulfonyl)-p-toluenesulfonimide, and if present, the salt is the sodium or potassium salt of N-(p-tolylsulfonyl)-p-toluenesulfonimide.

16. A method for producing a molded or extruded article of a carbonate polymer composition comprising the steps of:
(a) preparing a carbonate polymer composition comprising:
  (i) a carbonate polymer,
  (ii) a poly(oxyalkylene) derivative,
  (iii) a free di-sulfonimide represented by the formula:

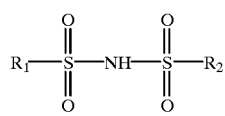

(1)

wherein $R_1$ and $R_2$ are independently an optionally substituted alkyl, aryl, arylalkyl or alkylaryl group, and
  (iv) optionally a salt capable of providing buffering character to the carbonate polymer composition containing the free di-sulfonimide and (b) molding or extruding said carbonate polymer composition into a molded or extruded article.

17. The method of claim 16 wherein the molded or extruded article is selected from the group consisting of packing parts having a container form for accommodating or packaging injectors, surgical tools, intravenous injectors, or operation instruments, or parts of artificial lungs, artificial kidneys, anesthetic inhalators, vein connectors, hemodialyzers, blood filters, safety syringes, centrifugal separators for blood, surgical tools, operation tools, or intravenous injectors.

18. A method for sterilizing a molded or extruded article of a carbonate polymer composition comprising the steps of:
(a) preparing a carbonate polymer composition comprising:
  (i) a carbonate polylmer,
  (ii) a poly(oxyalkylene) derivative,
  (v) a free di-sulfonimide represented by the formula:

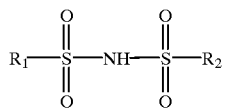

(1)

wherein $R_1$ and $R_2$ are independently an optionally substituted alkyl, aryl, arylalkyl or alkylaryl group, and
  (iv) optionally a salt capable of providing buffering character to the carbonate polymer composition containing the free di-sulfonimide,
(b) molding or extruding said carbonate polymer composition into a molded or extruded article, and
(c) irradiating said molded or extruded article with about 20 to about 50 kGy ionizing irradiation selected from the group consisting of alpha-rays, a heavy electron beam, a proton beam, beta-rays, a neutron beam, X-rays, and gamma-rays.

19. The method of claim 18 wherein the molded or extruded articles are selected from the group consisting of packing parts having a container form for accommodating or packaging injectors, surgical tools, intravenous injectors, or operation instruments, or parts of artificial lungs, artificial kidneys, anesthetic inhalators, vein connectors, hemodialyzers, blood filters, safety syringes, centrifugal separators for blood, surgical tools, operation tools, or intravenous injectors.

20. The method of claim 18 wherein the ionizing irradiation is gamma-rays.

21. The sterilized molded or extruded articles of claim 18.

22. The sterilized molded or extruded articles of claim 19.

23. The composition of claim 1 in the form of a molded or extruded article.

24. The composition of claim 1 in the form of a molded or extruded article selected from the group of packing parts having a container form for accommodating or packaging injectors, surgical tools, intravenous injectors, or operation instruments, or parts of artificial lungs, artificial kidneys, anesthetic inhalators, vein connectors, hemodialyzers, blood filters, safety syringes, centrifugal separators for blood, surgical tools, operation tools, or intravenous injectors.

* * * * *